(12) United States Patent
Clark et al.

(10) Patent No.: US 10,555,637 B2
(45) Date of Patent: Feb. 11, 2020

(54) BREWER WITH TEMPERATURE RESPONSIVE CONTROL VALVE

(71) Applicant: BUNN-O-MATIC CORPORATION, Springfield, IL (US)

(72) Inventors: Charles H. Clark, Springfield, IL (US); Ming Lung Huang, Springfield, IL (US); Kent E. Morman, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 245 days.

(21) Appl. No.: 15/449,376

(22) Filed: Mar. 3, 2017

(65) Prior Publication Data

US 2017/0251865 A1 Sep. 7, 2017

Related U.S. Application Data

(60) Provisional application No. 62/304,123, filed on Mar. 4, 2016.

(51) Int. Cl.
*A47J 31/56* (2006.01)
*A47J 31/46* (2006.01)
*A47J 31/44* (2006.01)
*A47J 31/10* (2006.01)

(52) U.S. Cl.
CPC ............ *A47J 31/56* (2013.01); *A47J 31/106* (2013.01); *A47J 31/4475* (2013.01); *A47J 31/465* (2013.01)

(58) Field of Classification Search
CPC ...................................... A47J 31/56

USPC ........................................................... 99/280
See application file for complete search history.

(56) References Cited

U.S. PATENT DOCUMENTS

| 2,601,579 A | 6/1952 | Wittmann |
| 3,347,151 A | 10/1967 | Ronalds |
| 3,442,199 A | 5/1969 | McGrail |
| 3,589,559 A | 6/1971 | Colton et al. |
| 3,606,829 A | 9/1971 | Alwood |
| 4,303,196 A | 12/1981 | Raines et al. |
| 4,674,400 A | 6/1987 | Rondel et al. |
| 4,917,005 A | 4/1990 | Knepler |
| 5,183,998 A | 2/1993 | Hoffman et al. |
| 5,307,733 A | 5/1994 | Enomoto |
| 5,718,162 A | 2/1998 | Hoover |

(Continued)

*Primary Examiner* — Lori L Baker
(74) *Attorney, Agent, or Firm* — Barnes & Thornburg LLP

(57) ABSTRACT

A beverage maker including a reservoir, an intermediate chamber, a beverage substance retaining container, a heating element associated with the reservoir and a temperature responsive valve assembly between the reservoir and intermediate chamber for controlling the flow of heated water from the reservoir. The beverage maker includes a sensor device coupled to the reservoir, spaced from the heating element, to detect a condition such as a temperature change, temperature, temperature range, or presence of absence of water within the reservoir to cease power to the heating element upon detecting the condition. The intermediate chamber is sized and dimensioned to accommodate a predetermined range of volumes of water flowing from the reservoir through the intermediate chamber. A spray head is provided on the intermediate chamber communicating with the volume of water retained therein to distribute the water over beverage making substance retained in the beverage substance retaining container.

20 Claims, 3 Drawing Sheets

(56) References Cited

U.S. PATENT DOCUMENTS

| | | |
|---|---|---|
| 5,823,095 A | 10/1998 | Walker |
| 5,964,141 A | 10/1999 | Andrew et al. |
| 6,003,569 A | 12/1999 | Williams |
| 6,050,175 A | 4/2000 | Mirand et al. |
| 6,227,101 B1 | 5/2001 | Rabadi et al. |
| 6,279,459 B1 | 8/2001 | Mork et al. |
| 6,705,208 B2 | 3/2004 | Lassota |
| 6,729,226 B2 | 5/2004 | Mangiapane |
| 6,964,222 B1 | 11/2005 | Tucker |
| 7,231,870 B2 | 1/2007 | Lowe et al. |
| 2004/0118298 A1 | 6/2004 | Lee |
| 2005/0247206 A1 | 11/2005 | Lyall et al. |

BREWER WITH TEMPERATURE RESPONSIVE CONTROL VALVE

CROSS REFERENCE TO RELATED APPLICATIONS

This application claims the benefit of priority under 35 U.S.C. § 119(e) to U.S. Provisional Patent Application No. 62/304,123, filed Mar. 4, 2016. The disclosure set forth in the referenced application is incorporated herein by reference in its entirety.

BACKGROUND

The present disclosure relates to beverage preparation apparatus, namely, brewers for infusing a beverage making substance with a heated substance such as water to produce a beverage.

A variety of beverage brewers have been developed which can be divided into two general classes. The two classes of beverage making equipment generally include pour-over brewers and boil-over or "burp and boil" brewers. There are differences and benefits associated with the use of a pour-over brewer compared to a burp and boil brewer. These differences generally relate to the speed with which a beverage can be produced as well as the quality of the beverage produced. The burp and boil brewers tend to take a considerably longer amount of time to produce the same volume of beverage and tend to brew the beverage at a temperature that may not be controlled and may be too hot to obtain an optimum brewed beverage.

The pour-over brewing system generally includes a heated reservoir that retains a volume of heated water. A quantity of water is added to the reservoir to displace the heated water thereby displacing or driving heated water out of the reservoir and into a brew basket or funnel portion of the apparatus that retains a brewing substance for brewing with the heated water. Since the water is provided in a heated condition and merely displaced by water entering the heated reservoir, the pour-over brewer operates as a "on demand" brewer. Further, the water added to the heated reservoir can be heated during the brewing cycle to increase the throughput of brewing cycles. Additionally, the temperature can be better controlled since the motive force to dispense the heated water is the displacement of the heated water from the reservoir.

In contrast, a burp and boil system generally provides longer brew times and less temperature control resulting in less controllable resultant brew characteristics. The burp and boil system operates by providing a reservoir for receiving water that feeds a heated water line. The heated water line is heated by a resistance-heating configuration. The water line is connected to the reservoir providing a source of water to fill the water line. As water enters the line while the line is heated by the resistance heating component, water rapidly is heated, boils, and expands out of the line and into the brewing substance. A less desirable side effect of this process is that the water must be heated to boiling or near boiling to be moved through the brewing cycle. In other words, the motive force for moving water from the reservoir through the brewing apparatus is the boiling process, which tends to create noise and vibration in the brewing process. This system also provides much less control of the specific temperature of the water produced, especially if water at a temperature lower than boiling is desired.

It has been reasoned that it may be desirable to increase the efficiency of the energy used to brew a beverage. In both of the two general types of brewing apparatus a relatively considerable amount of energy can be expended to produce a brewed beverage. The pour-over system conserves energy by using a lower temperature than the burp and boil system. However, an incremental amount of energy must be used to maintain the water in the reservoir at a desired temperature. In the burp and boil system, energy might be conserved by not maintaining a reservoir of water at a desired temperature but a considerable amount of energy must be invested to rapidly raise the temperature of the water to produce the boiling motive effect.

BRIEF DESCRIPTION OF THE DRAWINGS

The present disclosure will be described hereafter with reference to the attached drawings which are given as a non-limiting example only, in which.

Figure 1:
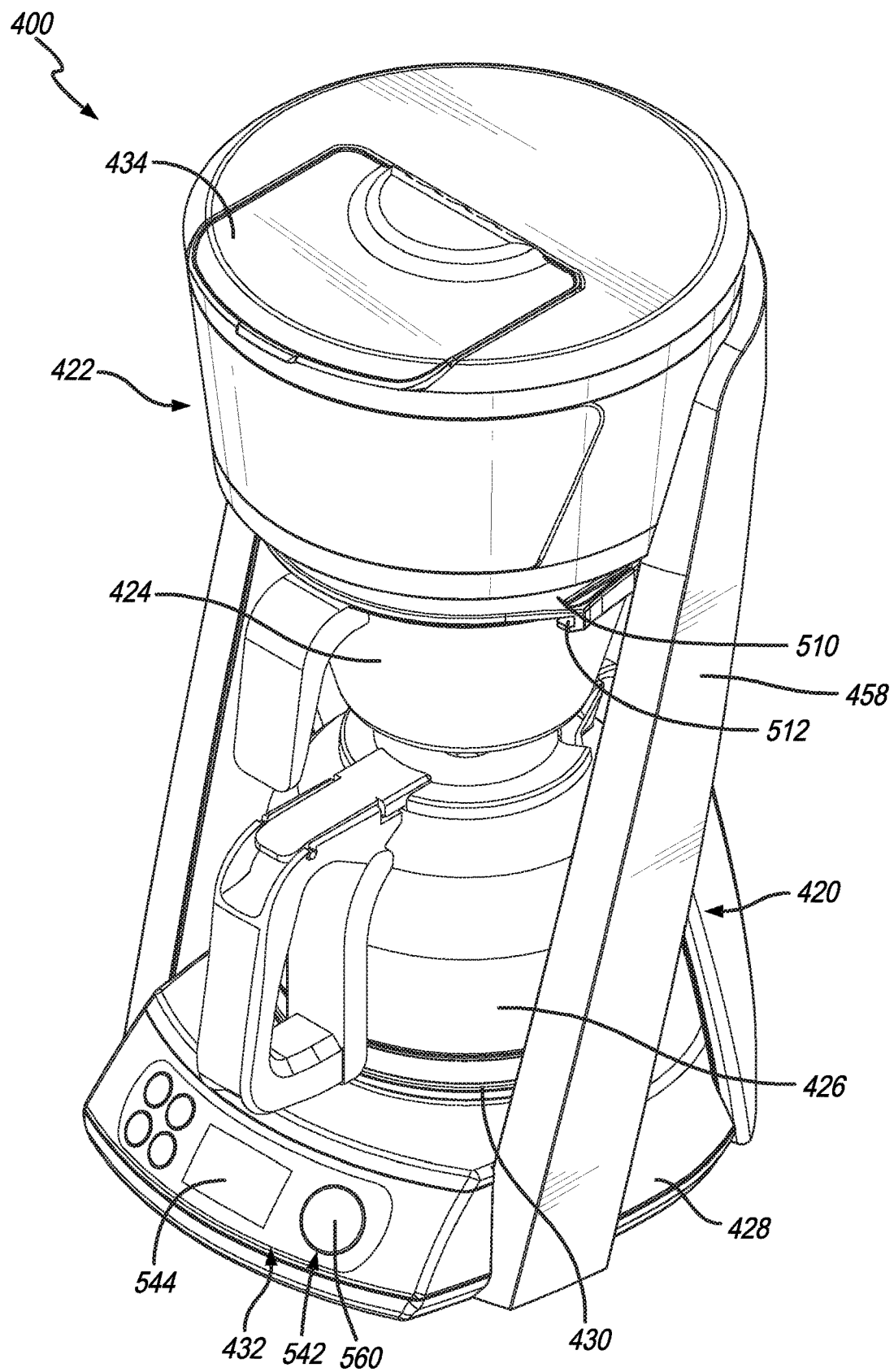
FIG. 1 is a perspective illustration of a beverage maker including a housing or frame structure supporting and connecting various components of the maker, an upper reservoir being positioned at an upper end of the structure with a beverage making substance funnel positioned below the reservoir with a carafe positioned below the funnel on top of a base connected to the structure with the arrangement of the components providing a gravity flow path for water to move from the upper reservoir through the funnel and to the carafe.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying modes of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

With reference to FIG. 1, a beverage maker 400 includes a housing or frame structure 420 providing support for several components or sub-assemblies that are associated with the maker 400. The arrangement of the maker 400 generally vertically aligns the various components and sub-assemblies to help facilitate and use gravity flow of water from an upper reservoir area 422, through a beverage substance retaining container or funnel assembly 424, and into a corresponding carafe 426 positioned below the funnel assembly 424. A base 428 is provided at the bottom of the frame 420 and, as will be described in more detail below, provides for a warming portion 430. The carafe 426 is positioned on the warming portion 430 to receive warming heat to keeping the beverage in the carafe warm. Alternatively, a thermal carafe may be used with the warmer powered off or with a base without the warmer portion. A control panel arrangement 432 coupled to a controller 454 housed in the base 428. Electrical power is provided over line 534 coupled to the controller 454.

Figure 2:
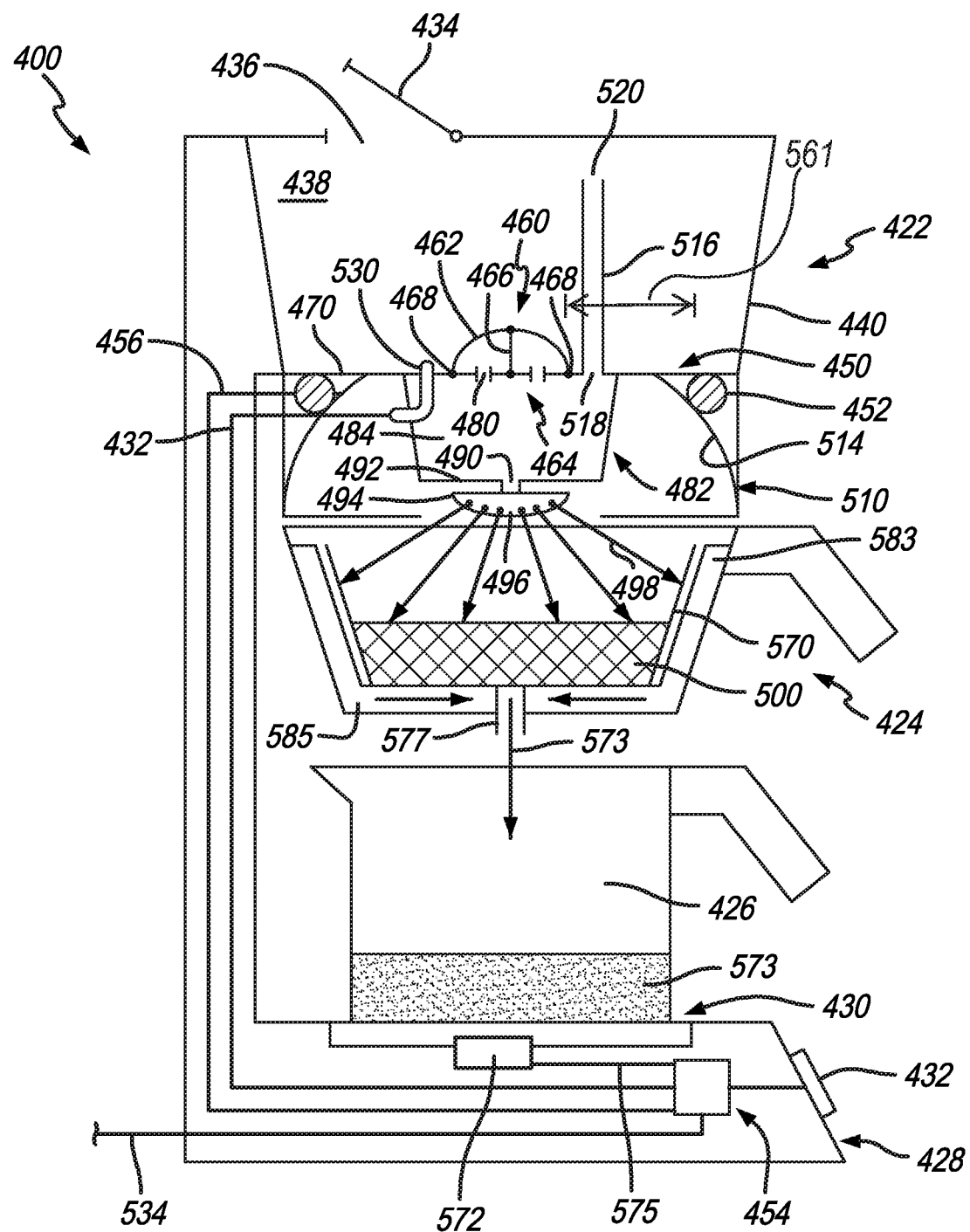
FIG. 2 is a diagrammatic illustration of the beverage maker illustrating various components in a diagrammatic manner for discussion of the structure, relationship, and function of these elements, the present beverage maker including the upper reservoir for receiving water, an intermediate chamber communicating with and receiving heated water from the upper reservoir, the intermediate chamber having a volume for receiving and retaining heated water and to limit further heating of the water and provide a buffer for dispensing water through a spray head communicating with the intermediate chamber, a bimetallic valve assembly is positioned between the upper reservoir and the intermediate chamber, the beverage substance retaining funnel is positioned below the spray head for receiving heated water from the spray head for mixing with the beverage making substance for dispensing a brewed beverage through a drain in the funnel assembly to a carafe waiting positioned there below.
Figure 3:
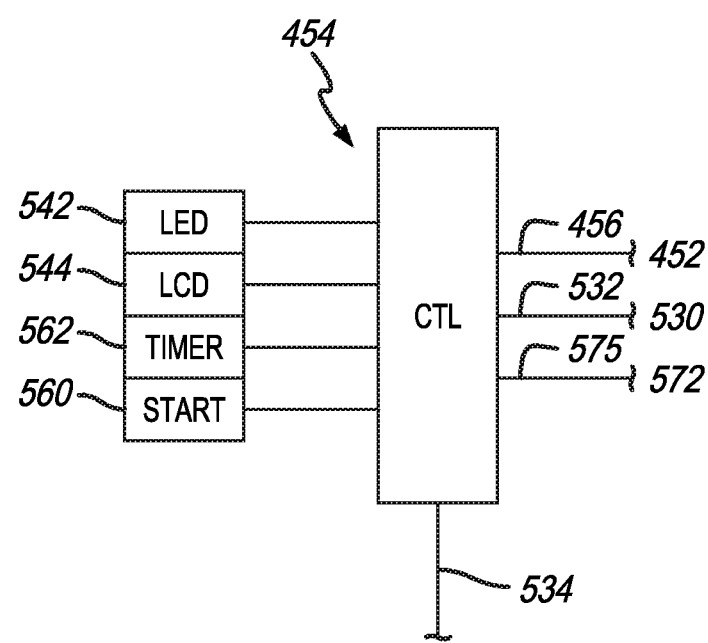
FIG. 3 is a diagrammatic illustration of a simplified version of an electrical schematic associated with the apparatus in FIGS. 1 and 2, various components shown in FIG. 2 corresponding to reference indicia in FIG. 3 to facilitate an explanation of the relationship between the electrical components in FIG. 2 and the controller in FIG. 3.

The upper reservoir 422 includes a top opening door or lid 434 which can be opened upwardly away from the reservoir to reveal an opening 436 for pouring water into an inner cavity 438 defined by walls 440 of the upper reservoir 422. Further reference is made to FIG. 2 in combination with FIG. 1 as descriptions of the various components are presented. The illustrations in FIG. 2 are provided by way of illustration and disclosure and not limitation and may be exaggerated or disproportionate since it is a diagrammatic illustration of these components and sub-assemblies.

As an overall design of the present maker 400 the cavity 438 of the upper reservoir retains a volume of water placed therein by the user. The volume of water is equal to the volume of the desired volume of brewer beverage. Perhaps a few extra ounces may be added to account to water that is absorbed by the coffee during the brewing process and which does not drain form the ground coffee at the end of the brewing cycle.

Water is retained by gravity at the lowest area of the reservoir. The reservoir includes a bottom 450. Underneath the bottom 450 on the outside of the reservoir is a generally circular heating element 452, the cross sections of the circular structure being shown in FIG. 2 on either side of the outside of the bottom 450 of the reservoir 422. By positioning the heating element 452 outside of the reservoir 422 and out of contact with water in the reservoir 422, the potential for lime build up on the heating element is reduced. The material used for at least the portion of the reservoir 422 that needs to receive heat form the heating element is chosen from a group of materials that are resistant to undesired change due to the heating effect of the heating element 452 and allow for heat transfer through the material to heat the water in the reservoir. The materials could be appropriate forms of metallic, plastics, glass, ceramic, combinations, and composites, which are currently known or hereafter discovered and suitable for this application.

The disclosed design is in contrast to prior art devices that use a heating element in direct contact with the water. Direct contact between the heating element and water tends to promote a buildup of lime and/or minerals on the heating element and this accumulation can tend to decrease the efficiency and operation of the heating element over time. Also, with the heating element positioned outside of the reservoir the heat transfer can be designed to propagate through the reservoir structure materials potentially increasing the surface area distribution of the heat energy provided by the heating element. The heating element 452 is controllably coupled to a controller 454 over line 456. The controller 454 is retained in the base 428 and the line 456 extends through the generally vertical support structures or arms 458 of the support structure 420.

A bimetallic valve assembly 460 is retained in the bottom area 450 of the upper reservoir 422. The valve assembly 460 includes a temperature responsive bimetallic disc 462 retained in a position overlying a grate or grill area 464. The grill area 464 is formed with several passages 480 contained within the perimeter of the disc 462. The bimetallic disc may be shown in an exaggerated form in the diagrammatic illustration but a range of disc shapes, sizes, diameters, materials and proportions are intended to be include in the present disclosure and covered by the claims. The purpose and utility of the disc is to provide a valve function that is responsive to the temperature of the water heated in the reservoir.

A post, fastener, rivet, or other device 466 is provided to retain the disc 462 in its normally, unheated concave orientation covering the grill 464. An outer edge or rim 468 of the contacts the inner surface 470 of the bottom 450 in the normal concave orientation of the disc 462. The normal concave orientation of the disc 462 results when the disc is not heated or returns to this orientation when the disc is allowed to cool after heating. This causes the disc to rest in this normal, unheated configuration in the concave shape with the rim 468 engaging the inside surface 470 of the bottom 450. The post 466 can retain the disc 462 in a condition in which there is some degree of flexion in the disc to provide a sealing engagement between the rim 468 and the inside surface 470. This maintains the valve 460 in a normally closed position and permits a user to pour water in through the opening 436 without the water flowing through the valve assembly 460. A gasket or seal 469 may be provided in the bottom of the reservoir for engagement by the rim of the disc or carried on the rim 468 to help provide some sealing effect against leakage, dimensional irregularities, or particles. The gasket is formed of a suitable material to allow for at least some degree of sealing. If carried on the disc the material should provide enough flexibility to cycle through the flexion of the disc to repeatedly open and close the opening.

When the heater is operated and a sufficient amount of energy is transferred to the water in the reservoir the disc 462 will become heated and once the materials in the disc reach a predetermined, designed transition point the disc will at least slightly or partially deform sufficiently to cause the rim 468 to disengage from the inside surface 470. When this occurs, water can flow past the disc 462 and through passages 480 in the grill 464. Water flowing from the upper reservoir 422 flows into an intermediate chamber 482 retained below the bottom 450 of the upper reservoir 422. The intermediate chamber 482 is sized and dimensioned to provide a cavity or bowl 484 to retain a more than nominal volume of water for dispensing over beverage making substance retained in the funnel 424. The intermediate chamber is sized so that a volume of water can transfer from the upper reservoir thereby reducing the amount of heating or continuing of the heating of the water in the reservoir. If only a small volume of water were allowed to pass through the valve the remaining water in the reservoir could become heated beyond a target heating temperature. An outlet or drain 490 is provided in a bottom 492 of the intermediate chamber 482. The drain is coupled to a spray head 494 that includes a series of holes 496 to distribute water 498 over a beverage brewing substance 500 retained in the funnel assembly 424.

The volume of the intermediate chamber 482 can range from the full volume of the reservoir to a volume generally based on the inflow and out flow rates of the chamber. An intermediate chamber equaling the full volume of the reservoir will accommodate the full heated volume of water when it is at the predetermined temperature as indicated by the operation of the disc. Depending on the physical dimensions of the overall machine and any limitations thereon providing a chamber equal to the full volume of the reservoir might not be possible in some configurations. As noted, the range of the intermediate change might be sized and dimensioned based on flow rates. In one example of this scenario, the intermediate chamber can be sized to provide a buffer volume to accommodate the inflow in excess of the out flow. If the inflow rate into the intermediate chamber from the reservoir is greater than the out flow from the chamber, the volume of the chamber can be sized to accept an accumulating difference of water. This will allow the heated water to exit the reservoir when at temperature, as some portion is already flowing out of the chamber through the sprayhead. The inflow and out flow rates can be determined based on the dimensions of the openings 480, 490, 496 in the reservoir, the chamber and the sprayhead. The intermediate chamber also allows for mixing of water at temperature with water that might have marginally cooled in the chamber to help provide a generally consistent water temperature throughout the entire brewing cycle.

A funnel retaining and cover structure 510 is positioned attached to a lower portion of the upper reservoir 422 as shown in FIGS. 1 and 2. This cover provides rails or channels 512 into which corresponding flanges on the funnel 424 can be positioned for retention below the spray head 494. This rail and flange arrangement is generally of known construction 1 the beverage maker industry. The cover 510 also allows moisture such as steam and other water evaporation from the brewing process to be returned into the funnel assembly. In other words, as steam evolves from the combination of water 498 and beverage making substance 500 the steam can collect on the inside surface 514 of the cover 510 and drain back into the funnel 424.

A steam vent chimney 516 is provided in communication with and extending upwardly from the intermediate chamber 482. This steam vent 516 communicates directly with the internal volume of the intermediate chamber 482 by means of the passage 518 in the upper portion of the chamber. Steam collecting in the intermediate chamber 482 can be vented upwardly through the vent 516 and back into the cavity 438 of the upper reservoir 422. Steam exits the vent 516 at the top opening 520 and collects inside of, condenses in, and drains back into the upper reservoir 422. The output of the top opening 520 is positioned spaced away from the fill water opening in the top of the reservoir. The steam recovery structures, including the cover 510 and the vent 516 help to minimize steam escape from the brewer. This helps reduce the mess that might otherwise result from traditional brewers or manually poured brewers that do not provide such steam control.

The vent 516 also equalizes the pressure in the chamber and prevents pressure build up due to steam. Because of preventing pressure buildup, the flow rates from the reservoir to the chamber and out of the chamber are maintained as designed for predetermined performance, and not subject to unpredictable fluctuations due to pressure changes. In addition, the positioning of the passage 518 in the upper portion of the chamber prevents water from flowing from the chamber into the vent tube. Similarly, the positioning the top opening of the vent in the upper portion of the reservoir prevents water from the reservoir overflowing the opening and unintentionally flowing into the chamber before reaching temperature. Generally, the top edge of the opening 520 is designed to be above the maximum water level in the reservoir to prevent overflow.

A sensor device in the form of an NTC thermistor 530 is provided in a location generally extending through or otherwise associated with and communicating with a lower portion of the cavity 438. This thermistor 530 acts as a temperature sensor and reacts over a predetermined temperature range. This thermistor 530 detects the temperature change of the water in the cavity 438 of the reservoir 422. The thermistor 530 is coupled over line 532 to the controller 454. During a brewing process once the heater 452 is activated heat energy is generated and transferred to water in the reservoir 422. When the disc flexes and uncovers the openings 418 to allow water to flow out of the reservoir, water drains through the open valve assembly 460 and the volume of the water in the cavity 438 decreases. When the thermistor 530 reacts to or detects a significant temperature change because of being generally exposed at the end of draining water from the cavity it provides a signal to the controller 454 to terminate power to the heating element 452. In other words, when a substantial portion of water has drained from the reservoir there will be less water to receive and absorb the heat energy from the heater 452. When this occurs the temperature inside the reservoir will noticeably increase relatively quickly. This change can be detected by the sensor device and then this signal, when received by the controller, will cause the controller to cease powering the heater. This circuit helps to make the system more energy efficient by turning off power to the heater when there is no more need to heat water. As noted above heated water is transferred from the reservoir to the intermediate chamber. When this occurs the time for heating can be shortened since the heat terminating event described above will occur sooner in the process, also saving energy. Generally, only the energy needed to bring the predetermined volume of water up to a desired temperature range is used in the disclosed brewer.

A user control panel 432 is provided on a front facing portion of the base 428. The control panel includes LEDs 542 associated with various control buttons or selections. An LCD 544 is provided on the control panel 540 to allow the controller to display text or other image information for viewing by the user. In addition, one of the buttons 560 could be designated as the start button used to activate the controller 454 to initiate various steps or to initiate a brewing process.

A timer 562 is included and coupled to the controller 454 and includes controllable buttons or other features or control means for allowing the user to adjust a clock timer 562 on the controller 454 as well as to adjust and otherwise control other features provided by the controller. As such, if a user desires coffee at a particular time of day the user can controllably set the time at the user control panel 540, position the funnel 424 loaded with the proper quantity of beverage making substance to make the brew at the desired time. Additionally, the user will deposit a predetermined volume of water into the upper reservoir 422 so that when the timer is activated water will be available for heating and brewing. The normally closed orientation of the disc in the valve assembly helps retain water against leakage from the reservoir. Since the temperature of the water will be generally at ambient temperature the disc will not flex or otherwise open until the heater is activated by the controller upon operation of the timer.

Positioned on the base 428 is a warming portion, pad, or area 430. The warming area includes a warming element in the embodiment illustrated, in the form of a PTC component 572. The warming element 572 is controllably coupled over line 575 to the controller 454. The carafe 426 retained on the warmer 430 will retain coffee 572 in a heated condition. The warmer 430 can be controlled to warm or not warm based on operation of one of the control buttons, after a predetermined period of time, or other condition.

During a brewing process, the user opens the lid 434 of the reservoir 422 and pours water through the fill water opening 436 into the cavity 438 of the reservoir. Since the reservoir is not heated, the bimetallic valve assembly 460 will be in the normally closed orientation. In the normally closed position, the disc 462 is in the concave orientation with the rim 468 generally sealing the area around the grill area 464. Once the user activates the start button 460, a signal is transferred through the controller 454 and activates the heating element 452 over line 456. Heat is transferred from the heating element 452 to the water within the cavity 438. When the water reaches a predetermined temperature or temperature range, the disc 462 deforms to disengage the rim 468 from the inside surface 470. The material of the disc, bimetallic material of a generally known construction, is selectively chosen for its deforming characteristics so that it deforms within at a predetermined range of heated water temperatures. For example, if it is desirable to have water at 205° F. for brewing coffee, the bimetallic disc material can be selected to deform at approximately 200° F. with a range of +/−5° F. This is but one example of a temperature setting or characteristic of such a bimetallic component. One of ordinary skill in the art, with the teachings of the present disclosure will now appreciate how to use similar or other bimetallic components of different settings or characteristics to achieve the valving function and results taught by this disclosure. Operation of the valve assembly results in the transfer of heated water through the now open valve assembly 460 from the upper reservoir 422 to the intermediate chamber 482.

The intermediate chamber 482 is of a sufficient volume to hold some of the already heated water so that it generally does not continue to heat beyond a predetermined range of brew temperatures. In addition, water that transfers from the upper reservoir 422 to the intermediate chamber 482 is water that is in the lower portion of the reservoir volume and closest to the heating element 452. As such, any lower temperature water positioned or layered above the water flowing from the reservoir will now tend to be closer to the heating element and the transfer of energy therefrom. The volume in the intermediate chamber 42 is more than nominal and water will accumulate in the chamber as it flows from the upper reservoir to the chamber 482. In addition, once the control valve 460 opens a volume of water is continuously flowing out of the chamber 490 through the spray head 494. While the volume flowing through the drain 490 may be smaller than the volume flowing through the grate 464 and the open valve 460, the flow paths are sized and dimensioned to help facilitate a smooth and consistent flow of properly heated water through the spray head 494 throughout the entire brewing process.

Towards the end of heating process, the thermistor 530 will react to or detect a change in temperature as water is drained from the reservoir 422 and little, if any, water remains. This will signal to the controller 454 to terminate power to the heating element 452. Over a relatively short period of time after completion of the brewing process, as the disc 462 cools, it will once again return to the normally closed position in preparation for another brewing cycle.

During the heating process, any evaporating water in the upper chamber 422 will return to the chamber since the lid 434 closes over the opening 436. In addition, as the most heated water flows from the reservoir 422 to the intermediate chamber 482, any steam will flow from the chamber upwardly through the vent 516 and back into the upper reservoir. When it condenses, it flows back into the intermediate chamber 482 for dispensing through the spray head 494. As water 498 flows from the spray head into the funnel assembly 424, the water will mix with the beverage making substance retained within a filter 570 of known construction retained in a known manner within the funnel 424. The filter 570 is positioned on top of ribs 583, 585 that provide spaces between neighboring ribs, in a known manner associated with brewer funnels. The ribs help allow the flow of beverage from the filter 570 to the drain hole 577. The combined water and beverage making substance will mix and form slurry to produce a beverage 573 that flows out through a lower drain opening 577 of the funnel 424 and into the carafe 426. Fresh beverage, such as coffee, is retained in the carafe and a warming element 572 is provided below the carafe on the base 428.

All of the activity associated with the flow of water and resultant brewed beverage from the reservoir 422, to the intermediate chamber 482, to the funnel 424, and into the carafe 426 occurs as result of gravity flow. The heating element 452, when activated by the controller 454 either due to a manual or timer start, starts the entire gravity flow process. Once a sufficient amount of energy is transferred from the heating element 452 to the water in the reservoir 422 the trip point of the material forming the disc 462 will be achieved causing the disc 462 to deform and open the valve 460. Once the bimetallic valve assembly 460 allows water to flow there through, the rest of the process occurs due to gravity flow though the predefined flow paths. The thermistor 530 detects temperature change and provides a signal to the controller to help reduce the continued, unnecessary operation of the heating element 452 and provides feedback or control of the overall system.

This heating configuration eliminates potential for significant lime or other mineral build-up on the heating element 452. In contrast to prior art assemblies, the disclosed apparatus and methods reduce lime or other mineral deposits. Prior art devices may use a heating element in which water flows through a heated tube external to the funnel assembly. These types of beverage makers are typically referred to "burp and boil" brewers. One of the complications with a burp and boil system is that lime or other minerals deposits tend to accumulate on the inside surface of the tube used for the heating process. Over time, the accumulation of material in this tube can constrict the diameter of the tube reducing flow rate and provide a degree of insulation and reducing the heat transfer efficiency. This can significantly extend the time needed for brewing beverage and may result in producing an inconsistent brewed beverage. In contrast, the disclosed invention helps to maintain efficiency and reliability of the process.

The present disclosure provides a control mechanism that operates in response to achieving a target range of water temperatures. The present disclosure eliminates circulation and/or recirculation through a heating tube that can also reduce the vibrational activity associated with typical burp and boil brewers. This can also help reduce the noise generated by the brewer during the brewing process. In the disclosed apparatus, energy is transferred directly to the reservoir and not through a relatively small diameter restricted tube as used in burp and boil system. Once the valve assembly 460 transitions from the normally closed position to the open position, water flows smoothly little or no noise or vibration. Furthermore, there are no complicated mechanical or electrically operated valves to malfunction. The simple and very reliable operation of the bimetallic valve greatly increases the reliability of the present apparatus. Additionally, the heating element 452 is spaced away 561 from the disc 462 to provide highly reliable and predictable transition from the closed valve 460 position to the open position.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A beverage maker comprising:
a reservoir;
at least one passage in the reservoir permitting moving water from the reservoir;
a valve assembly positioned in the reservoir proximate to and cooperative with the at least one passage for controllably retaining water in the reservoir when the water is below a predetermined temperature range and allowing water to drain from the reservoir when the temperature of the water is above a predetermined temperature range;
a heating element spaced from the valve assembly to provide heat energy to water retained in the reservoir for use in a brewing process but being sufficiently spaced away to have generally no direct effect on the valve assembly;
an intermediate chamber positioned below and in communication with the reservoir for receiving water flowing from the reservoir;
a drain positioned in the lower portion of the intermediate chamber for allowing passage of water therethrough; and
a beverage substance retaining container positioned below the intermediate chamber for receipt of water from the intermediate chamber through the drain for mixing with a beverage substance retained within the container, the container including a drain opening through which beverage can drain; and
wherein the reservoir is positioned above the intermediate chamber which is positioned above the beverage substance retaining container to facilitate the gravity flow of water from the reservoir to the intermediate chamber when the temperature of the water is above a predetermined temperature range and to continue to flow from the intermediate chamber to the beverage substance retaining container.

2. The beverage maker of claim 1 wherein the valve assembly includes a bi-metallic valve component responsive to the temperature of the water in the reservoir.

3. The beverage maker of claim 1 further comprising a carafe positioned below the drain of the container for receiving beverage therein.

4. The beverage maker of claim 3 further comprising a structure and a base positioned at a lower portion of the structure on which the carafe can be placed.

5. The beverage maker of claim 4 further comprising a warming portion generally retained in the base for providing heat energy to a carafe placed thereon.

6. The beverage maker of claim 1 further comprising a spray head coupled to and communicating with the drain of the intermediate chamber for distributing water from the intermediate chamber over beverage making substance retained in the container.

7. The beverage maker of claim 1 further comprising the heating element being attached to the beverage maker and positioned outside of the reservoir to prevent direct contact between the heating element and water retained in the reservoir.

8. The beverage maker of claim 1 further comprising a steam vent communicating with the intermediate chamber and the reservoir, the steam vent being positioned for communicating with the upper portion of the intermediate chamber and extending into and through the reservoir to a position above an upper water level to facilitate transfer of steam from the intermediate chamber to the reservoir without passing water from the reservoir into the intermediate chamber through the vent.

9. The beverage maker of claim 1 further comprising a sensor positioned proximate to the reservoir for detecting the temperature of water in the reservoir;
a controller, the sensor being coupled to the controller;
the heating element being coupled to the controller; and
wherein the signal from the sensor is used by the controller to cease energizing the heating element.

10. The beverage make of claim 1 further comprising a controller, a timer coupled to the controller to allow activation of the beverage maker at a predetermined scheduled time in the future.

11. A beverage maker comprising:
a reservoir;
at least one passage in the reservoir permitting moving water from the reservoir;
a valve assembly positioned in the reservoir proximate to and cooperative with the at least one passage for controllably retaining water in the reservoir when the water is below a predetermined temperature range and allowing water to drain from the reservoir when the temperature of the water is above a predetermined temperature range;
a heating element spaced from the valve assembly to provide heat energy to water retained in the reservoir for use in a brewing process but being sufficiently spaced away to have generally no direct effect on the valve assembly;
an intermediate chamber positioned below and in communication with the reservoir for receiving water flowing from the reservoir;
the intermediate chamber being sized and dimensioned to accommodate a volume of water ranging from a volume equal to the volume of the reservoir to a volume equal to a volume which is calculated based on the differential accumulation of water flowing from the reservoir to the intermediate chamber and out through the drain in the intermediate chamber;
a drain positioned in the intermediate chamber for allowing passage of water therethrough; and
a beverage substance retaining container positioned below the intermediate chamber for receipt of water from the intermediate chamber through the drain for mixing with a beverage substance retained within the container, the container including a drain opening through which beverage can drain.

12. The beverage maker of claim 11 wherein the valve assembly includes a bi-metallic valve component responsive to the temperature of the water in the reservoir.

13. The beverage maker of claim 11 further comprising a carafe positioned below the drain of the container for receiving beverage therein.

14. The beverage maker of claim 13 further comprising a structure and a base positioned at a lower portion of the structure on which the carafe can be placed.

15. The beverage maker of claim 14 further comprising a warming portion generally retained in the base for providing heat energy to a carafe placed thereon.

16. The beverage maker of claim 11 further comprising a spray head coupled to and communicating with the drain of the intermediate chamber for distributing water from the intermediate chamber over beverage making substance retained in the container.

17. The beverage maker of claim 11 further comprising the heating element being attached to the beverage maker and positioned outside of the reservoir to prevent direct contact between the heating element and water retained in the reservoir.

18. The beverage maker of claim 11 further comprising a steam vent communicating with the intermediate chamber and the reservoir, the steam vent being positioned for communicating with the upper portion of the intermediate chamber and extending into and through the reservoir to a position above an upper water level to facilitate transfer of steam from the intermediate chamber to the reservoir without passing water from the reservoir into the intermediate chamber through the vent.

19. The beverage maker of claim 11 further comprising a sensor positioned proximate to the reservoir for detecting the temperature of water in the reservoir;
   a controller, the sensor being coupled to the controller;
   the heating element being coupled to the controller; and
   wherein the signal from the sensor is used by the controller to cease energizing the heating element.

20. The beverage make of claim 11 further comprising a controller, a timer coupled to the controller to allow activation of the beverage maker at a predetermined scheduled time in the future.

\* \* \* \* \*